(12) United States Patent
Wahlqvist et al.

(10) Patent No.: US 8,368,345 B2
(45) Date of Patent: Feb. 5, 2013

(54) BATTERY CHARGING SYSTEM FOR CONTROLLING THE SUPPLY OF CHARGING CURRENT DEPENDING ON BATTERY TEMPERATURE, A BATTERY OPERATED SYSTEM AND A METHOD FOR STATE CONTROLLED CHARGING

(75) Inventors: Bengt Wahlqvist, Vikmanshyttan (SE); Borje Maleus, Bro (SE)

(73) Assignee: CTEK Sweden AB, Vikmanshyttan (SE)

( * ) Notice: Subject to any disclaimer, the term of this patent is extended or adjusted under 35 U.S.C. 154(b) by 384 days.

(21) Appl. No.: 12/646,405

(22) Filed: Dec. 23, 2009

(65) Prior Publication Data
US 2011/0148342 A1    Jun. 23, 2011

(30) Foreign Application Priority Data
Dec. 22, 2009 (EP) .................................... 09180286

(51) Int. Cl.
*H02J 7/00* (2006.01)
*H01M 10/44* (2006.01)
*H01M 10/46* (2006.01)

(52) U.S. Cl. ........................ 320/101; 320/150

(58) Field of Classification Search .................. 320/101
See application file for complete search history.

(56) References Cited

U.S. PATENT DOCUMENTS

| | | | |
|---|---|---|---|
| 4,383,211 A | 5/1983 | Staler | |
| 5,334,925 A | 8/1994 | Kendrick | |
| 5,585,994 A | 12/1996 | Tamai et al. | |
| 5,608,304 A | 3/1997 | Okumura | |
| 5,880,576 A * | 3/1999 | Nagai | 320/138 |
| 6,229,285 B1 | 5/2001 | Ding | |
| 6,518,731 B2 | 2/2003 | Thomas et al. | |
| 7,253,589 B1 | 8/2007 | Potanin et al. | |
| 7,391,185 B2 | 6/2008 | Tsubaki et al. | |
| 7,535,199 B2 | 5/2009 | Kimura et al. | |

(Continued)

FOREIGN PATENT DOCUMENTS

| | | |
|---|---|---|
| CN | 11207188 | 12/2006 |
| EP | 1717926 A2 | 11/2006 |
| JP | 2003040050 | 2/2003 |
| WO | 2008/099558 A1 | 8/2008 |

OTHER PUBLICATIONS

NEC, "Protection circuit of lithium ion rechargeable battery", Jul. 9, 2004, http://www.nec-tokin.com/english/product/me/chisiki/li9.html.

(Continued)

*Primary Examiner* — Arun Williams
(74) *Attorney, Agent, or Firm* — Young & Thompson (57) ABSTRACT

A battery charging system (15) and method for state controlled charging of a battery (12). The battery charging system comprises two parallel paths (16, 17) for supplying charging current to the battery (12) from two parallel sources of charging current, an energy source (13) and a controlled charging device (14). A control unit (18) is adapted to control the supply of charging current along the two paths in response to a detected state of the battery (12). If a state above a predetermined threshold is detected, the control unit (18) controls the supply of charging current such that the battery (12) receives charging current from the controlled charging device (14), but not directly from the energy source (13). The detected state of the battery may e.g. be a temperature state. The present invention allows for balancing the demands of high charging rate and long expected lifetime of the battery (12).

17 Claims, 6 Drawing Sheets

U.S. PATENT DOCUMENTS

| | | | |
|---|---|---|---|
| 8,076,905 B2 * | 12/2011 | Ko et al. | 320/134 |
| 2002/0101219 A1 * | 8/2002 | Yuasa et al. | 320/150 |
| 2003/0025481 A1 | 2/2003 | Bertness | |
| 2004/0257041 A1 | 12/2004 | Nagaoka | |
| 2006/0103355 A1 * | 5/2006 | Patino et al. | 320/138 |
| 2008/0111517 A1 * | 5/2008 | Pfeifer et al. | 320/101 |
| 2008/0231236 A1 | 9/2008 | Watanabe et al. | |

OTHER PUBLICATIONS

GBP Battery Co., Ltd., "Protection Circuit Modules (PCM)", http://gbp.en.alibaba.com/product/50083025-50125396/Protection_Circuit_Modules_PCM_.html.

* cited by examiner

BATTERY CHARGING SYSTEM FOR CONTROLLING THE SUPPLY OF CHARGING CURRENT DEPENDING ON BATTERY TEMPERATURE, A BATTERY OPERATED SYSTEM AND A METHOD FOR STATE CONTROLLED CHARGING

TECHNICAL FIELD

The present invention relates to the arrangements and methods for battery charging and in particular to methods and arrangements for controlled charging based on a detected state of the battery.

BACKGROUND

A rechargeable battery, such as a lead-acid battery or a lithium-ion battery, has a limit for how much current it should be charged with. During charging the battery reacts by becoming warmer. High temperatures should be avoided since it may be harmful to the battery. In extreme cases the battery may explode or break down. If the battery can be prevented from becoming too warm, the expected lifetime of the battery can be prolonged.

A protection circuit that is adapted to disconnect a battery when the surface temperature of a battery rises over a given temperature is disclosed in the U.S. Pat. No. 5,608,304.

There are also other conditions apart from high temperature states during which a high charge current may impact the battery negatively. Some batteries have a current limit that depends on its State of Charge (SOC) or previous charge history.

At the same time as it is desired to prevent the battery from becoming too warm or harmed due to some other type of condition it is also desirable to achieve fast and efficient charging of the battery. There is therefore a need for methods and apparatuses that achieve a good balance between these two competing interests.

SUMMARY

An object of the present invention is to provide arrangements and a method that facilitate a high battery charging rate while at the same time providing protection of the battery to harmful conditions.

The above stated object is achieved by means of a battery charging system, a battery operated system and a method according to the independent claims.

A first embodiment of the present invention provides a battery charging system comprising a first path for supplying charging current from an energy source to a battery and a second path, in parallel with the first path, for supplying charging current from a controlled charging device to the battery. The battery charging system further comprises a control unit for controlling the supply of charging current along the first and second paths in response to a detected state of the battery. For this purpose, the control unit is adapted to communicate with a state sensor for receiving information regarding the detected state of the battery. The control unit is also adapted to control the supply of charging current along the first and second paths such that the battery receives charging current from the controlled charging device via the second path, and not from the energy source via the first path, in response to detection of a state of the battery above a predetermined threshold.

A second embodiment of the present invention provides a battery operated system comprising a battery charging system as described above according to the first embodiment. The battery operated system further comprises an energy source connected to the first path of the battery charging system, a controlled charging device connected to the second path of the battery charging system, and a battery connected to the first and second paths of the battery charging system. The battery operated system also includes a state sensor adapted to detect a state of the battery and having a communication connection with the control unit of the battery charging system.

A third embodiment of the present invention provides a method for state controlled charging of a battery. The method comprises a step of detecting a state of the battery and a step of supplying charging current to the battery in response to the detected state of the battery. According to the method the supply of charging current to the battery is controlled such that the battery receives charging current from an energy source via a first path and from a controlled charging device via a second path, in parallel with the first path, until a state above a predetermined threshold is detected. When it is detected that the state is above the predetermined threshold, the supply of charging current to the battery is controlled such that the battery receives charging current from the controlled charging device but not from the energy source via the first path.

An advantage of embodiments of the present invention is that they prolong the expected service life of batteries by preventing batteries from reaching harmful conditions during charging, such as high temperatures or voltages.

Another advantage of embodiments of the present invention is that a high charging rate of batteries can be maintained without jeopardizing the lifetime of the batteries. This is made possible since embodiments of the present invention allow for tuning of the charging current in relation to the state of the battery. By using two parallel sources of charging current two parallel "tuning tools" are provided. When both sources of charging current are connected to the battery a high charging rate is achieved. If a state (e.g. a temperature) over a given limit is detected one of the sources of charging current is disconnected, thus allowing the charging to continue but at a lower rate. The ability to connect or disconnect a source of charging current can be seen as a tool for coarse tuning of the charging current. A tool for fine tuning of the charging current is achieved by the use of a controlled charging device, e.g. an intelligent battery charger, as one of the sources of charging current. These tuning tools provide efficient measures for adapting the charging current to the detected state of the battery and allow for balancing the demands for high charging rate and long expected lifetime of the battery.

Another advantage of certain embodiments of the present invention is that not only the state of the battery may be considered when controlling the charging current supplied to the battery. In certain embodiments an ambient state such as the ambient temperature is also considered. A temperature state that can be harmful to the battery may arise not from the actual temperature of the battery, but from the fact that the increase in battery temperature is high. By monitoring the ambient temperature it is possible to provide a more efficient protection of the battery from harmful temperature states.

Yet a further advantage of embodiments of the battery charging system of the present invention is that it is easy to adapt to appropriate charging of different battery types or chemistries by changing threshold(s) and parameters applied by the control unit. Assume for instance that the battery charging system originally was set-up for a lead-acid battery, which later on is replaced with a Lithium-Ion battery with a different demand on charge algorithm. Existing energy sources, like alternators, can be used if the charging is controlled correctly using parameters and state threshold(s) that match the demands of the Lithium-Ion battery. Thus by adjusting the parameters and thresholds of the control unit, the battery charging system can easily be adapted to appropriate operation with many different types of batteries.

These and other advantages with, and aspects of, the present invention will become apparent from the following detailed description and from the accompanying drawings.

BRIEF DESCRIPTION OF THE DRAWINGS

In the following description of embodiments of the invention, reference will be made to the accompanying drawings of which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Figure 1:
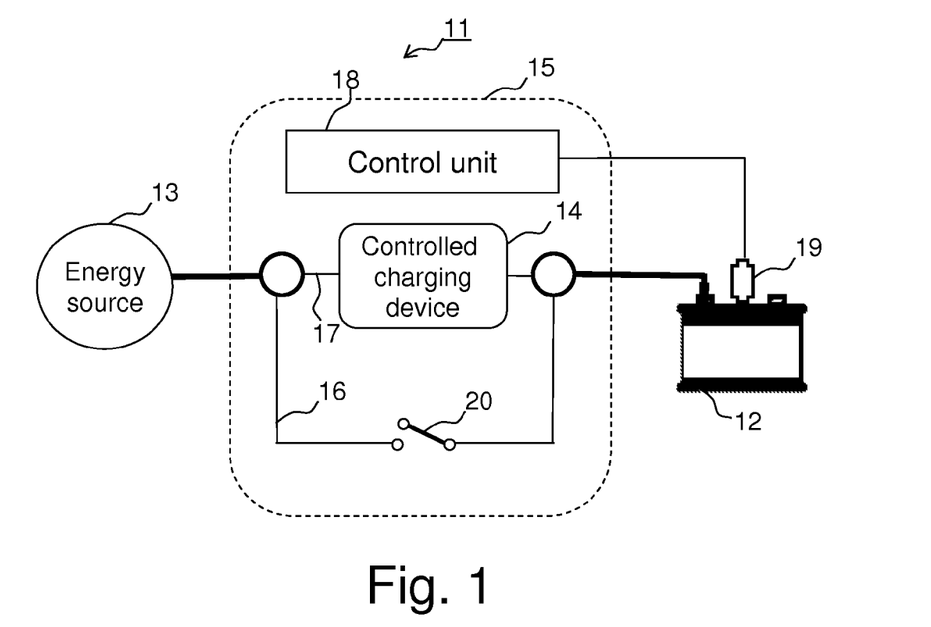
FIG. 1 is a schematic block diagram of a battery operated system with a battery charging system according to an embodiment of the present invention.

FIG. 1 is a schematic block diagram of a battery operated system 11 according to an embodiment of the present invention. The system 11 may for instance be installed in a vehicle such as a recreational vehicle, a car, an ambulance or a boat. The system 11 comprises a rechargeable battery 12, e.g. a lead-acid battery. The system 11 further comprises an energy source 13, such as e.g. an alternator, a photovoltaic panel, a wind generator or a generator, and a controlled charging device 14, such as an intelligent multi-stage battery charger. The energy source 13 and the controlled charging device 14 can supply charging current to the battery 12 via a battery charging system 15. In the embodiment illustrated in FIG. 1 the controlled charging device is illustrated as included in the battery charging system, although it is also possible to implement the controlled charging device as an external unit that is connected to the battery charging system 15.

The battery charging system comprises a first path 16 for supplying charging current from an energy source 13 to the battery 12 and a second path 17 for supplying charging current from the controlled charging device 14 to the battery 12. The first and second paths are parallel, so from the view point of the battery it has two parallel sources of charging current, one via the first path 16 and one via the second path 17. The battery charging system 15 also comprises a control unit 18 that is adapted to control the supply of charging current along the first and second paths. The control unit is able to communicate with a state sensor 19 that can detect a state of the battery 12. In this embodiment it is assumed that the sensor 19 is a temperature sensor that can detect a temperature state of the battery. However, according to other embodiments the sensor 19 may be a different type of sensor for detecting another type of battery state, such as the State of Charge (SOC). The control unit 18 can thus adapt the supply of charging current along the first and second paths 16, 17 in relation to information received from the temperature sensor 19 regarding the temperature state of the battery 12. When a temperature state of the battery 12 above a predetermined first threshold level is detected, the control unit 18 may disconnect the first path 16 in order to protect the battery from reaching a harmful temperature state. The charging of the battery 12 may then continue with a reduced charging current, via the second path 17 and the controlled charging device 14. Furthermore the controlled charging device 14 may be adapted to further control the charging current via the second path depending on the temperature state of the battery, thus providing fine tuning of the charging current.

By means of the battery charging system 15 in FIG. 1, it is possible to provide the battery with charging current above the operating limit of the controlled charging device and consequently achieve a faster charging rate of the battery than would have been possible without the connection to the energy source via the first path. If it is detected that the battery is becoming too warm it is possible to quickly reduce the charging current by disconnecting the first path. The first path may e.g. be provided with a relay 20 under the control of the control unit 18 for this purpose. Disconnecting or connecting the second path can thus be used as a tool for coarse tuning of the charging current supplied to the battery, while the controlled charging device can be used as a tool for fine tuning of the charging current with smaller increments/decrements. As an example it may be assumed that the controlled charging device is able to provide a maximum charging current of 20 A to the battery. However, if it is possible to supply 30 A from the energy source to the battery via the first path, the maximum charging current that can be supplied to the battery is 50 A.

As mentioned above the control unit is able to control the charging current supplied to the battery in response to a detected temperature state. It is possible that the charging current is controlled by adjusting the charge voltage in response to the detected temperature state of the battery. As an example it may be assumed e.g. that the battery has a temperature of 20° C. when the charging starts. This is considered to be a temperature state for which it is safe to use a high charging rate so the control unit controls the supply of charging current so that the battery receives charging current from both the first and second paths. The battery becomes warmer when it is charged. It is possible that the charging current is fine tuned according to the detected temperature state of the battery by adjusting the output voltage of the controlled charging device without disconnecting the supply of charging current via the first path. However, 70° C. may e.g. have been predetermined as a first temperature threshold. When it is detected that the temperature of the battery is at or above the first temperature threshold (70° C. in this example) the control unit reduces the charging current supplied to the battery by disconnecting the first path. It is also possible that the control unit implements a second temperature threshold, e.g. 80° C. at which it completely stops the supply of charging current to the battery (i.e. no charging current is supplied to the battery neither via the first path nor via the second path).

As mentioned above, the present invention is not limited to detection of a temperature state of the battery. It is possible to adapt the above described battery charging system to control the charging of the battery in response to other types of detected battery states, such as the SOC of the battery. The above mentioned first threshold would then relate to one or several detected SOC parameters instead of the battery temperature. There are several different ways of detecting the SOC of a battery as is well known to the person skilled in the art, e.g. by means of voltage measurement, measurement of internal impedance of the battery, measurement of current over time (Coulomb counting), and detection of weight of active chemicals. The most appropriate method depends on the battery type. The temperature sensor 19 in FIG. 1 may thus be replaced by some other type of appropriate state sensor in other embodiments of the invention, depending on the type of battery parameter that is to be monitored to detect the state of the battery. The state sensor may either be external and connected to the battery, or in some cases integrated into the battery.

Figure 2:
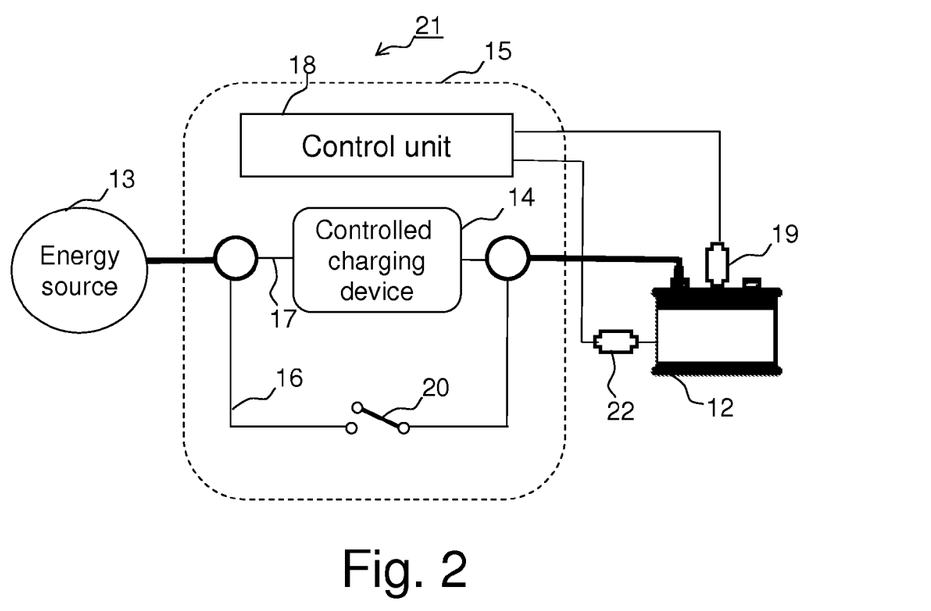
FIG. 2 is a schematic block diagram of a battery operated system with a battery charging system according to an alternative embodiment of the present invention.

In embodiments of the present invention in which the detected state of the battery is a temperature state, it may be important to detect the actual temperature of the battery to determine when a temperature state that may be harmful to the battery is reached. But it may also be important to consider the temperature increase during charging and consider the ambient temperature. FIG. 2 illustrates an alternative embodiment of a battery operated system 21 according to the present invention. The battery operated system 21 resembles the system 11 in FIG. 1, but is also provided with a second temperature sensor 22 for detecting the ambient temperature. The second temperature sensor 22 is able to communicate with the control unit 18 so that the control unit is able to control the supply of charging current also in response to the detected ambient temperature. Accordingly the control unit may be adapted to control the charging current based on the difference between the temperature of the battery and the ambient temperature instead of only based on the temperature of the battery. Another possibility is that the control unit is implemented such that the first and/or second temperature thresholds mentioned above depend on the ambient temperature. If the ambient temperature is 10° C. and the temperature of the battery is 40° C. this may be equally or more harmful to the battery as a temperature state when the ambient temperature is 25° C. and the battery temperature is 70° C.

As mentioned above the control unit may be adapted to control the supply of charging current in relation to a first and/or second threshold (e.g. temperature thresholds or thresholds related to some type of SOC parameter) in order to reduce the charging current in response the detected battery state. In a corresponding way the control unit may be adapted to increase the charging current in response to one or several temperature thresholds. Assume for instance that the second path was disconnected when a battery temperature of 70° C. was detected. The control unit may then reconnect the second path when a battery temperature at or below a third temperature threshold is detected e.g. 55° C. If the first and the third temperature thresholds are different, the battery charging system 11, 21 exhibit hysteresis. The control unit is preferably a programmable unit such as a microprocessor that is programmed with e.g. a look-up table comprising one or several of the above mentioned thresholds or a control algorithm in which the detected state parameters, such as voltage, internal impedance or battery temperature and/or ambient temperature, are input parameters.

Figure 3:
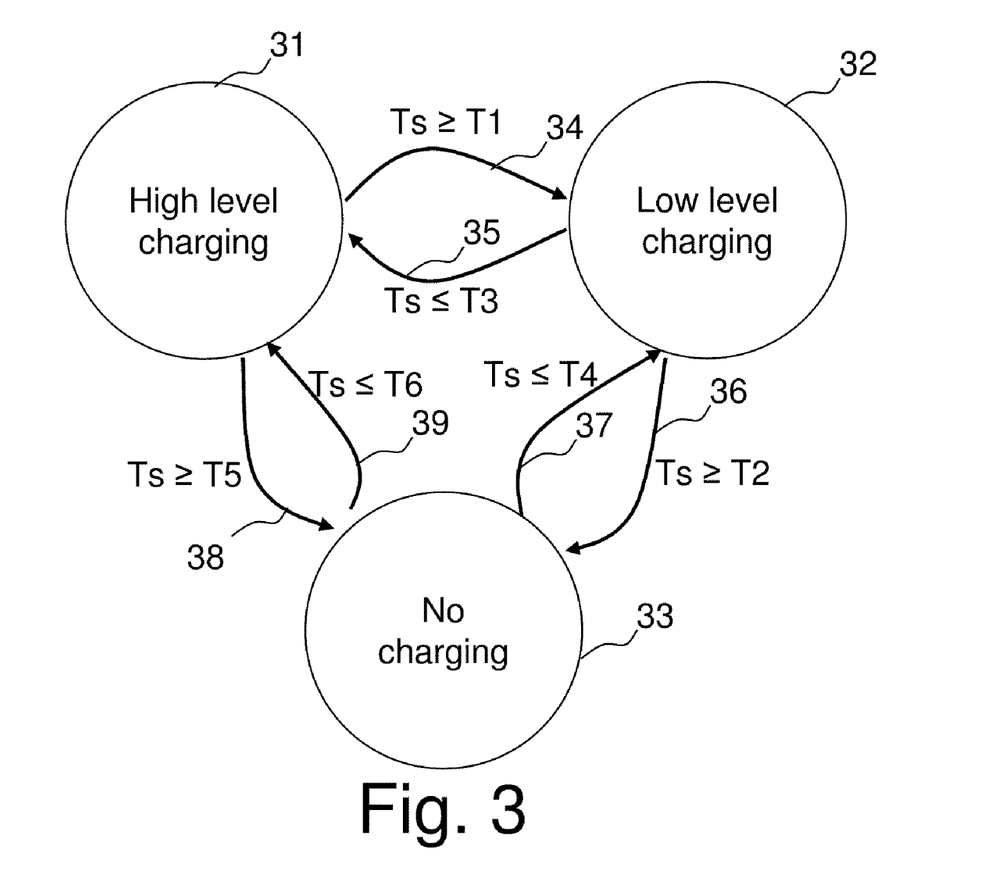
FIG. 3 is a state diagram of different states of a battery operated system according to an embodiment of the present invention.

FIG. 3 is a state diagram of an embodiment of a battery charging system according to the present invention. When the battery charging system is in a high level charging state 31 the battery is supplied with charging current from the energy source via the first path and from the controlled charging device via the second path. When the battery charging system is in a low level charging state 32 the first path is disconnected and the battery is supplied with charging current only from the controlled charging device via the second path. In a no charging state 33, no charging current is supplied to the battery neither via the first path nor via the second path. Transitions 34-39 between the different states 31-33 may occur based on a detected battery state (denoted Ts in FIG. 4) which may include battery temperature and/or ambient temperature, voltage, internal impedance, weight of active chemical, Coulomb count etc. Each transition may be associated with a condition that e.g. is related to a separate parameter threshold. The transition 34 from the high level charging state to the low level charging state may for instance occur when a state in which a monitored parameter is detected to exceed a first threshold (here denoted T1) is detected. Corresponding thresholds T2-T6 may be associated with the other illustrated transitions 35-39. The state diagram in FIG. 3 is merely provided as an example to illustrate different options for how state controlled charging may be implemented according to different embodiments of the present invention. Depending on the application scenario it may e.g. be desirable to implement all or only a few of the transitions 34-39 illustrated in FIG. 3.

Figure 4:
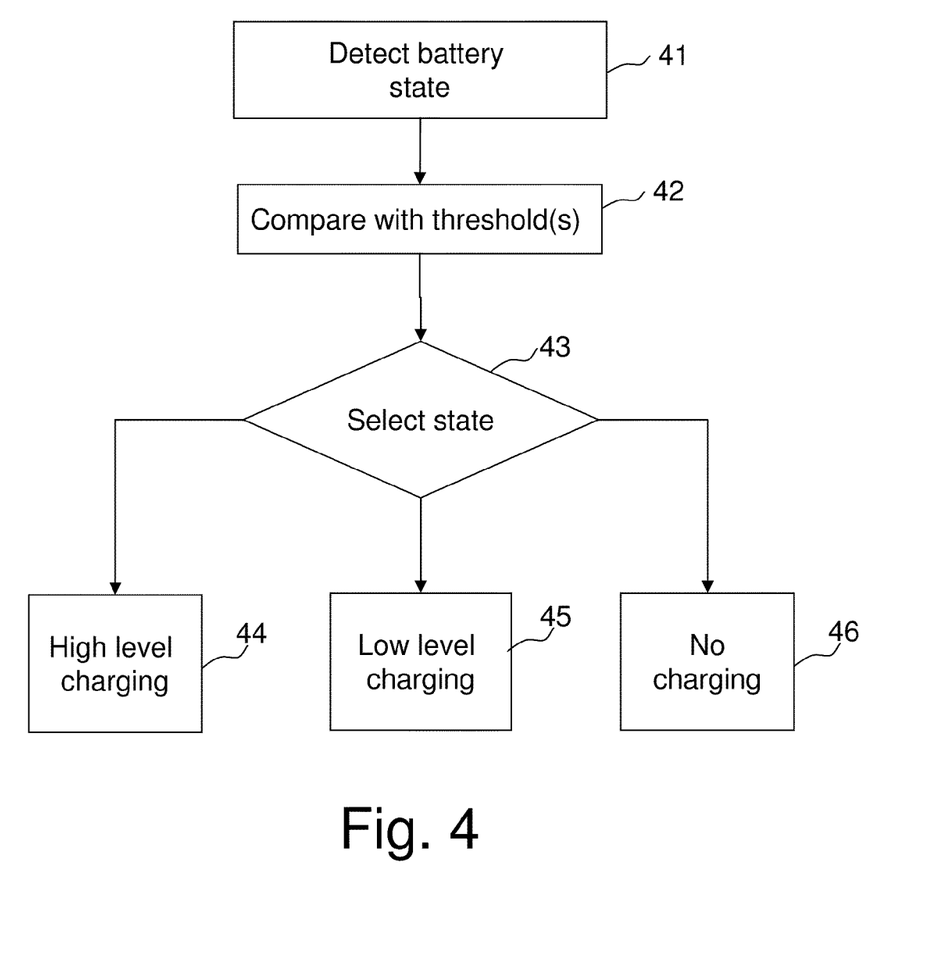
FIG. 4 is a flow diagram of a method according to an embodiment of the present invention.

FIG. 4 is a flow diagram illustrating an embodiment of a method for temperature controlled battery charging according to the present invention. In a step 41 a battery state is detected. This battery state detection may include detection of the temperature of the battery by means of the first temperature sensor 19 and perhaps also detection of the ambient temperature by means of the second temperature sensor 22. Alternatively the battery state detection 41 may include detection of some SOC parameter. The detected battery state is compared with the threshold(s) implemented in the battery charging system 15 in a step 42. In a step 43 an appropriate amount of charging current to be supplied to the battery is selected based on the detected battery state. The steps 42 and 43 are performed by means of the control unit 18. The selected appropriate charging current is provided to the battery by means of either applying charging current from both the energy source via the first path and from the controlled charging device via the second path (high level charging, step 44), by means of applying charging current from the controlled charging device via the second path and no charging current via the first path (low level charging, step 45), or by applying no charging current neither via the first path nor via the second path (no charging, step 46).

Figure 5:
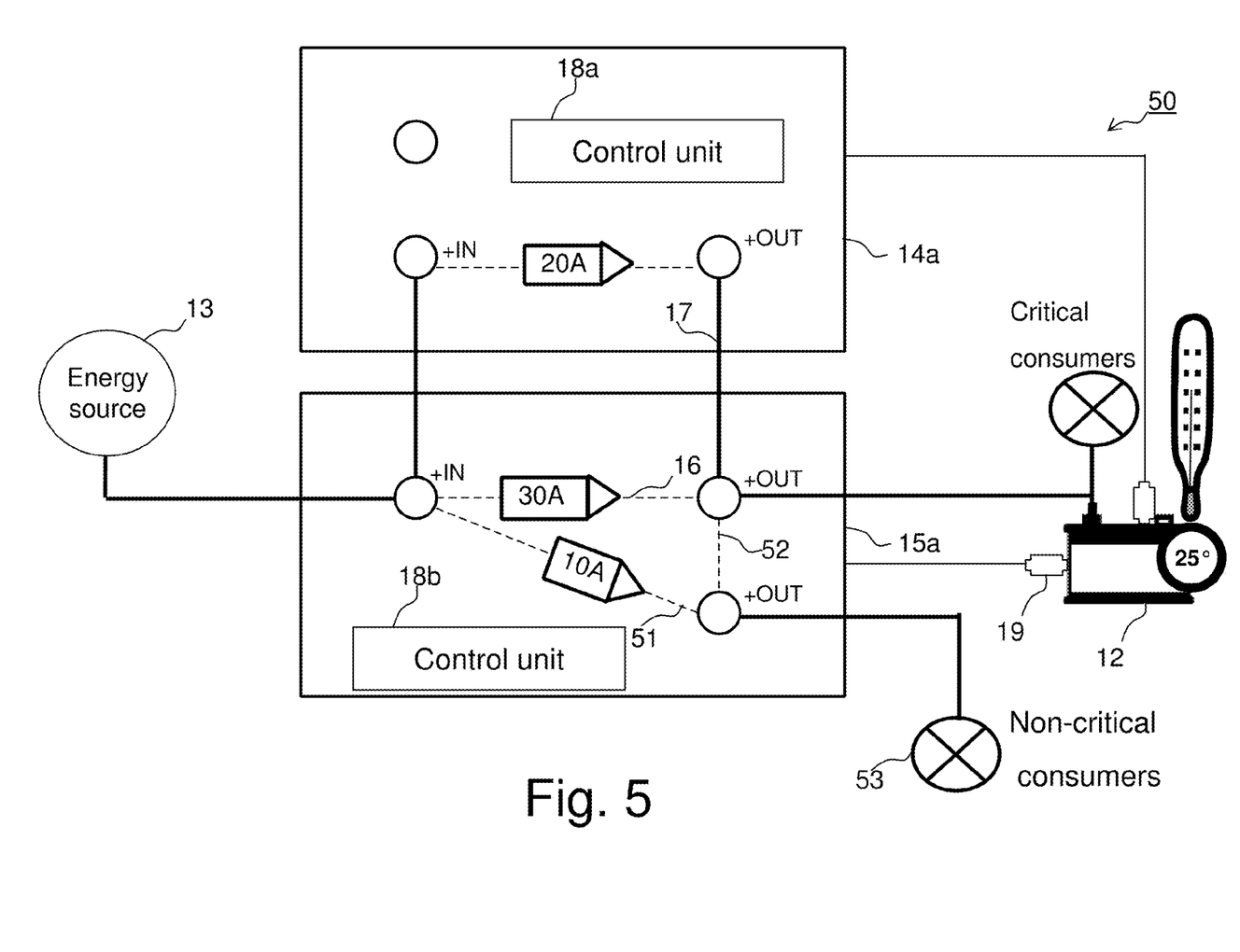
FIGS. 5-7 are schematic block diagrams of an embodiment of a battery operated system as well as schematic illustrations of three exemplary application scenarios of different temperature states and charging rates.
Figure 6:
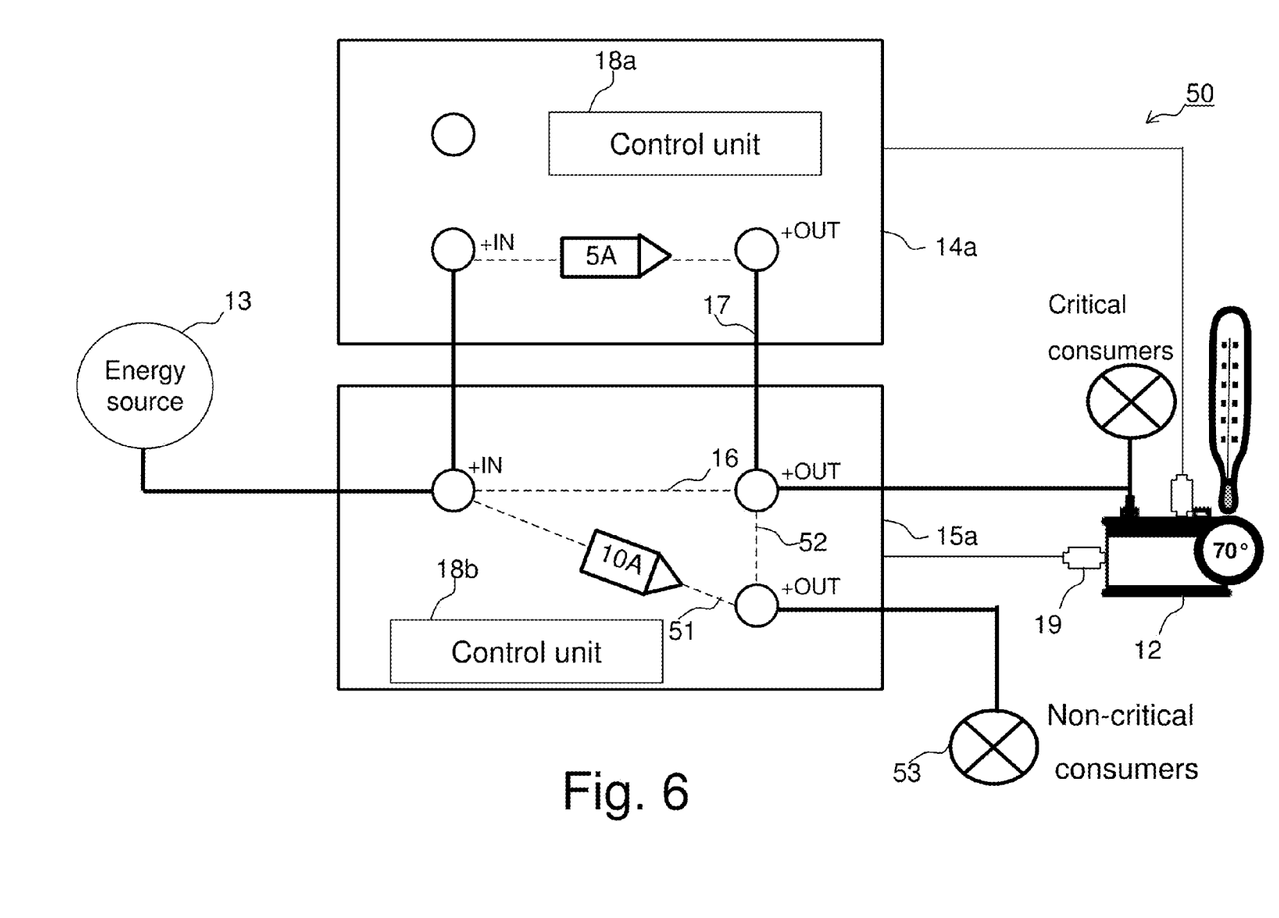
Figure 7:
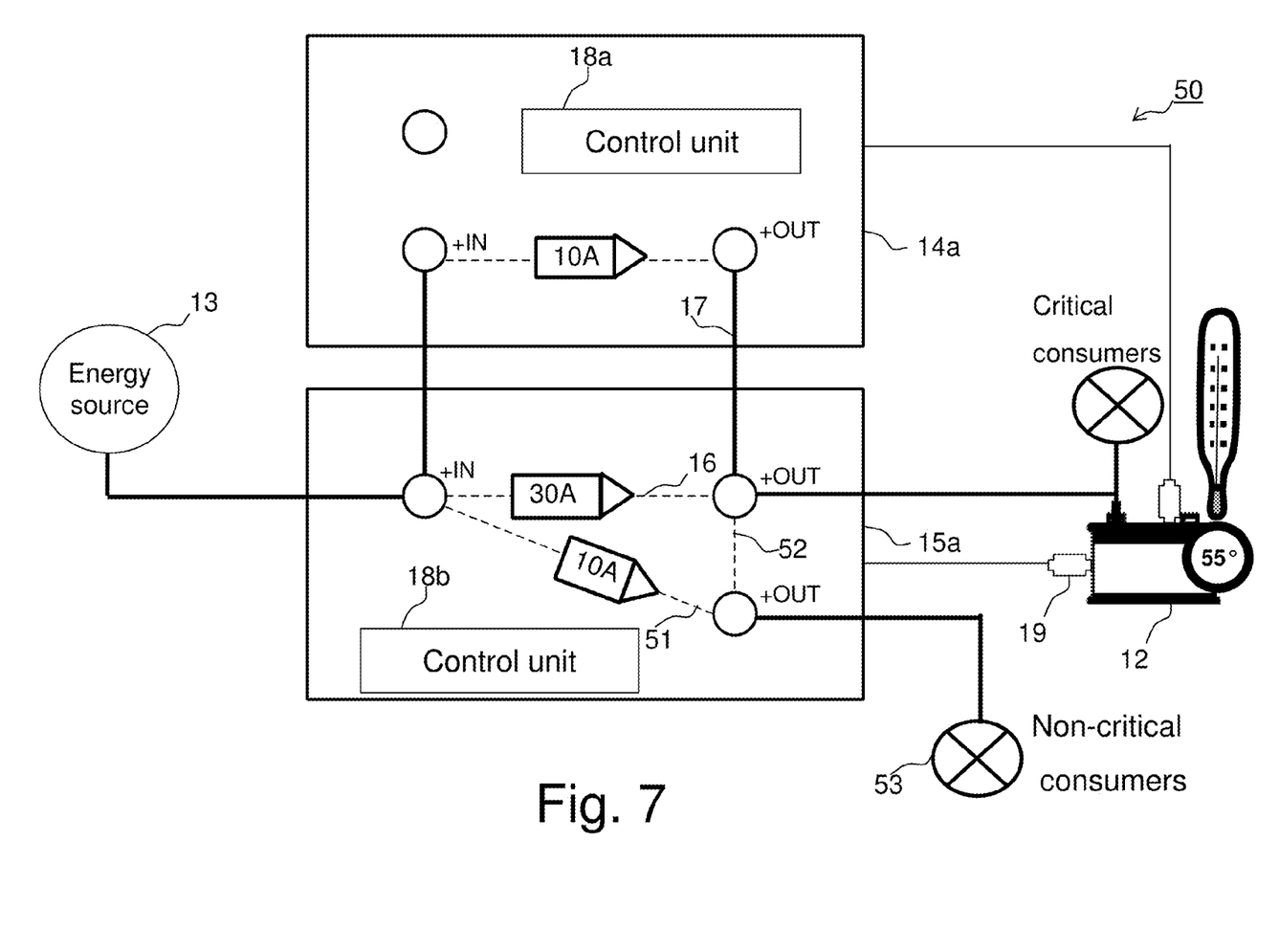

FIGS. 5-7 are schematic block diagrams of how a battery operated system 50 according to the invention (such as the system 21 shown in FIG. 2) can be implemented according to an embodiment of the invention using two separate units 14a and 15a. Each unit 14a, 15a is provided with a housing, and closing links are used to connect the different ports on the units as illustrated in FIG. 5. The unit 14a is an intelligent DC/DC-charger (i.e. a controlled charging device) and the unit 15a is a battery switch. The first path 16 passes through the battery switch, and the battery switch also comprises a path 51 and a path 52 by means of which the battery switch is able to control the supply of electrical energy to a set of consumers 53 such that the consumers 53 receive electrical energy from either the energy source 13 or from the battery 12. During charging of the battery, the battery switch controls the supply of electrical energy to the set of consumers 53 such that electrical energy is supplied from the energy source 13 thus separating the supply of charging current and the supply of electrical energy for consumption to the set of consumers 53.

In FIG. 5 it is illustrated that the units 14a and 15a each include a control unit 18a and 18b respectively. The control units 18a and 18b may comprise functionality which all in all corresponds to the control unit 18 in FIG. 1 and FIG. 2.

In FIG. 5-7 three different exemplary temperature states are illustrated in order to describe possible application scenarios. These application scenarios are used merely as examples to facilitate understanding of the invention and not for purposes of limitation.

In the scenario illustrated in FIG. 5 the battery temperature is 25° C., which is below the predetermined first temperature threshold according to this exemplary embodiment. Therefore the battery 12 is charged via the first path 16 with a current of 30 A from the energy source 13 and via the second path 17 with a current of 20 A from the controlled charging device 14. FIG. 5 thus illustrates a situation with a high charging rate. When the charging rate is high it is also expected that the battery will become warmer.

In the scenario illustrated in FIG. 6 the battery temperature has risen to 70° C., which is above the predetermined first temperature threshold according to this exemplary embodiment. Therefore the charging current supplied to the battery is reduced. The control unit has stopped the supply of charging current via the first path to reduce the charging current compared with the scenario in FIG. 5. The battery is still being charged but at a much slower rate by means of a 5 A current from the controlled charging device via the second path 17.

In the scenario illustrated in FIG. 7, the reduced charging rate which was applied in FIG. 6 has resulted in that the battery has cooled down to 55° C. According to this exemplary embodiment the battery temperature has now sunk below a temperature threshold at which it is considered safe to return to a higher charging rate. Therefore the battery is again supplied with a charging current of 30 A via the first path 16. The controlled charging device provides a charging current of 10 A via the second path 17 according to this exemplary embodiment at the battery temperature of 55° C.

From the different embodiments it has been shown that the control unit 18 can be implemented as a single unit or divided into several units. It is possible for the control unit to be a separate unit or integrated into and distributed over other components in the battery charging system 15. The term control unit is rather to be understood as the collective function of controlling the supply of charging current the first and second paths. The control unit may be implemented using e.g. one or several microprocessors or using discrete circuits as will be understood by the person skilled in the art.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A battery charging system, comprising:
a first switchable path for supplying charging current from an energy source to a battery;
a second path, in parallel with the first switchable path, for supplying charging current from a controlled charging device to the battery; and
a control unit for controlling the supply of charging current along the first switchable path and the second path in response to a detected temperature of the battery,
wherein the control unit is configured to communicate with a first temperature sensor for receiving information regarding the detected temperature of the battery, and to control the supply of charging current along the second path and to break the first switchable path such that the battery receives charging current from the controlled charging device via the second path, and not from the energy source via the first switchable path, in response to detection of the temperature of the battery above a predetermined first threshold temperature.

2. The battery charging system according to claim 1, wherein the control unit is further configured to control the supply of charging current along the first switchable path and the second path such that no charging current is supplied to the battery from the controlled charging device or from the energy source in response to detection of a temperature of the battery above a predetermined second threshold temperature.

3. The battery charging system according to claim 1, wherein the control unit is further configured to, in response to detection of a temperature of the battery below a predetermined third threshold temperature, connect the first switchable path and the second path such that the battery is supplied with charging current from both the energy source and the controlled charging device.

4. The battery charging system according to claim 3, wherein the control unit is further configured to
communicate with a second temperature sensor for receiving information regarding a detected ambient temperature, and to
control the supply of charging current along the first switchable path and the second path in response to the detected ambient temperature.

5. The battery charging system according to claim 4, wherein said first threshold temperature is dependent on the detected ambient temperature.

6. The battery charging system according to claim 4, wherein said first threshold temperature is specified in terms of a temperature difference between the temperature of the battery and the ambient temperature.

7. The battery charging system according to claim 1, wherein the first switchable path supplies charging current directly from the energy source to the battery.

8. A battery operated system, comprising:
a battery charging system comprising
a first switchable path for supplying charging current from an energy source to a battery,
a second path, in parallel with the first switchable path, for supplying charging current from a controlled charging device to the battery, and
a control unit for controlling the supply of charging current along the first switchable path and the second path in response to a detected temperature of the battery, the control unit being configured to communicate with a first temperature sensor for receiving information regarding the detected temperature of the battery, and to control the supply of charging current along the second path and to break the first switchable path such that the battery receives charging current from the controlled charging device via the second path, and not from the energy source via the first switchable path, in response to detection of the temperature of the battery above a predetermined first threshold temperature;

an energy source connected to the first switchable path of the battery charging system;

a controlled charging device connected to the second path of the battery charging system;

a battery connected to the first switchable path and the second path of the battery charging system; and a first temperature sensor adapted to detect the temperature of the battery and having a communication connection with the control unit of the battery charging system.

9. The battery operated system according to claim 8, wherein the energy source is an alternator, photovoltaic panel, wind generator or generator.

10. The battery operated system according to claim 8, wherein the battery operated system further comprises a second temperature sensor adapted to detect an ambient temperature and having a communication connection with the control unit of the battery charging system, and wherein the control unit is further configured to control the supply of charging current along the first switchable path and the second path in response to the detected ambient temperature.

11. The battery operated system according to claim 10, wherein the first threshold temperature is dependent on the detected ambient temperature.

12. The battery operated system according to claim 10, wherein the first threshold temperature is specified in terms of a temperature difference between the temperature of the battery and the ambient temperature.

13. The battery operated system according to claim 8, wherein the first switchable path supplies charging current directly from the energy source to the battery.

14. A method for state controlled charging of a battery, the method comprising:

detecting a temperature of the battery; and supplying charging current to the battery in response to the detected temperature of the battery, wherein the supply of charging current to the battery is controlled such that the battery receives charging current from an energy source via a first switchable path and from a controlled charging device via a second path, in parallel with the first switchable path, until a temperature above a predetermined first threshold temperature is detected, and when the temperature is detected to be above the predetermined first threshold temperature, the supply of charging current to the battery is controlled such that the battery receives charging current from the controlled charging device but not from the energy source via the first switchable path.

15. The method according to claim 14, wherein the supply of charging current to the battery is controlled such that no charging current is supplied to the battery from the controlled charging device or from the energy source when a temperature above a predetermined second threshold temperature is detected.

16. The method according to claim 14, wherein the method further comprises detecting an ambient temperature, and said first threshold temperature depends on the detected ambient temperature.

17. The method according to claim 14, wherein the battery receives charging current from the energy source directly via the first switchable path.

* * * * *